July 9, 1968 R. W. CAMPBELL 3,392,294
ALTERNATING CURRENT GENERATOR
Filed July 8, 1964 3 Sheets-Sheet 1

INVENTOR.
Robert W. Campbell
BY C. R. Meland
His Attorney

July 9, 1968 R. W. CAMPBELL 3,392,294
ALTERNATING CURRENT GENERATOR
Filed July 8, 1964 3 Sheets-Sheet 3

INVENTOR.
Robert W. Campbell
BY
C. L. McLand
His Attorney

# United States Patent Office 3,392,294
Patented July 9, 1968

3,392,294
ALTERNATING CURRENT GENERATOR
Robert W. Campbell, Anderson, Ind., assignor to General Motors Corporation, Detroit, Mich., a corporation of Delaware
Filed July 8, 1964, Ser. No. 381,127
8 Claims. (Cl. 310—168)

This invention relates to a generator and more particularly to an alternating current generator of the inductor type.

One of the objects of this invention is to provide an inductor type brushless alternator which is capable of developing a higher output for the same size machine as compared to known inductor alternators.

Another object of this invention is to provide an inductor type alternator which is provided with flux by an electromagnetic field and by permanent magnets.

Still another object of this invention is to provide an inductor type alternator which is designed to reduce detrimental leakage flux that ordinarily flows across the notches or slots of the rotor of an inductor alternator. This object is accomplished by providing the rotor with one or more permanent magnets that counteract the leakage flux and which provides a useful flux for the machine.

Another object of this invention is to provide an inductor alternator that has a rotor which includes two stacks of laminations and permanent magnets.

Further objects and advantages of the present invention will be apparent from the following description, reference being had to the accompanying drawings wherein preferred embodiments of the present invention are clearly shown.

Figure 1:
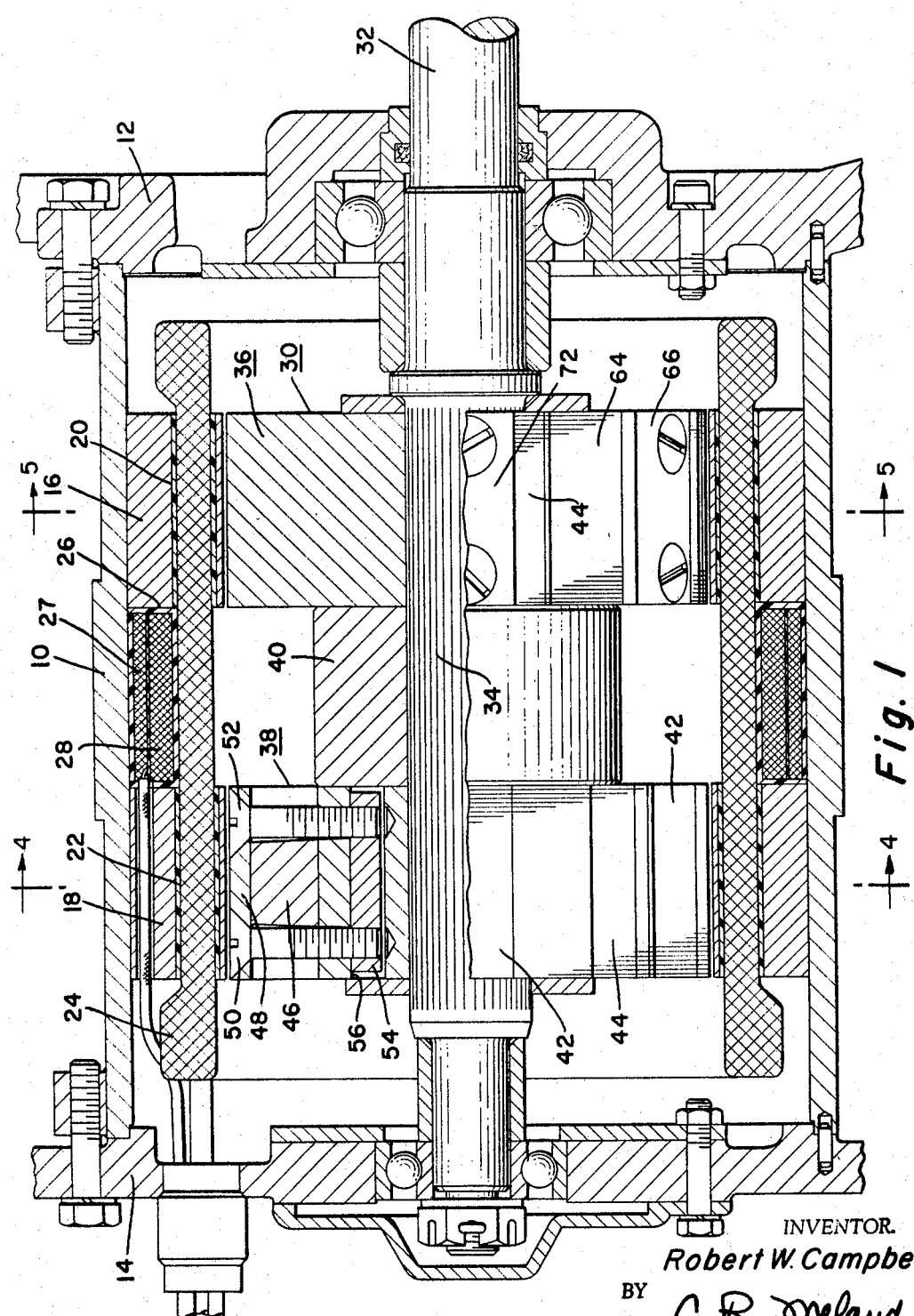
FIGURE 1 is a sectional view of an alternating current generator made in accordance with this invention.

Referring now to the drawings and more particularly to FIGURE 1, the reference numeral 10 designates a tubular frame which is formed of magnetic material such as steel. The frame 10 is clamped between the end frames 12 and 14 which are formed of a metal material such as aluminum.

The tubular frame 10 carries two stacks of steel laminations 16 and 18 which are secured to and supported by the tubular frame 10. The stacks of steel laminations 16 and 18 each have a plurality of slots 20 and 22, the slots in one stack of laminations being aligned with the slots in the other stack of laminations. The circumferentially spaced slots in the stacks of laminations 16 and 18 receive conductors which form a stator winding 24. This stator winding can be a single phase winding or can be a three phase winding either Y or delta connected. In the arrangement shown, the winding 24 is a three phase Y-connected winding.

Positioned between the lamianation stacks 16 and 18 is a coil form 26 which supports a field coil. The field coil can be either a single winding or may include two separate windings as shown, one of which would be a main field winding 28 and the other of which would be a bucking or reverse field winding 27.

The rotor for the alternating current generator is generally designated by reference numeral 30. This rotor includes a shaft 32 which is journalled for rotation in bearings located respectively in the end frames 12 and 14.

The shaft 32 has a knurled or splined section 34. Positioned on the knurled section 34 are stacks of steel laminations 36 and 38 and a solid core member 40 located between the stacks of laminations and engaging the stacks of laminations.

The core member 40 is formed of a magnetic material such as soft iron. The stacks of laminations 36 and 38 and the core member 40 are press fitted to the splined section 34 so that these parts rotate with the shaft 34. The laminations that make up the stacks 36 and 38 are secured together in any well known manner.

The laminations that make up the stack 38 are formed to provide alternate teeth 42 and notches 44. The teeth 42 are displaced angularly, for example, by 60°.

Figure 2:
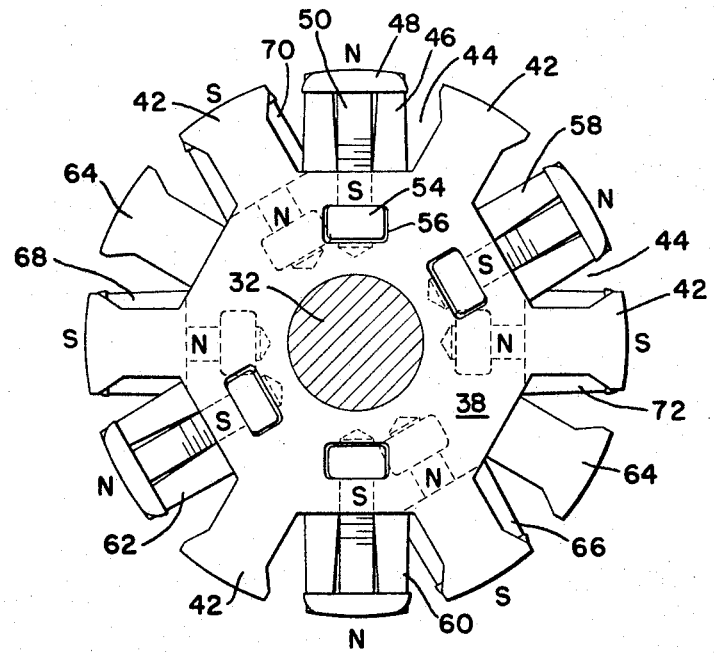
FIGURE 2 is an end view of a rotor which forms a part of the generator shown in FIGURE 1.

A permanent magnet 46 is located in one of the notches 44 and has the polarity indicated in FIGURE 2. The permanent magnet 46 is clamped between a part of the stator stack 38 and a steel plate 48. The plate 48 receives screws 50 and 52 which are threaded into a nut 54. The nut 54 is disposed within a longitudinally extending slot 56 formed in the stator stack 38.

The rotor stack 38 carries three other permanent magnets 58, 60 and 62. These permanent magnets are secured to the rotor stack 38 in the same manner as the securement of permanent magnet 46 to the rotor stack 38. It is seen that permanent magnet 46 is angularly displaced 60° from permanent magnet 58 and that the permanent magnets 60 and 62 are displaced 60° from each other. The permanent magnets 46 and 60 are 180° from each other and this same relationship exists for permanent magnets 58 and 62.

The rotor stack 36 is formed to provide teeth 64 which like the teeth 42 of the stack 38 are located 60° from each other. The rotor stack 36 has notches formed by the teeth and some of these notches have permanent magnets 66, 68, 70 and 72. The permanent magnets 66 through 72 are fixed to the rotor stack 36 in the same manner as the permanent magnet 46 is secured to rotor stack 38.

The permanent magnets on the rotor stack 38 are aligned with four teeth 64 on the stack 36. Two of the teeth of the rotor stack 38, namely those located between permanent magnets 60 and 62 and between permanent magnets 46 and 58 are aligned with notches in the rotor stack 36 as is apparent from an inspection of FIGURES 2, 4 and 5. The four permanent magnets on the lamination stack 36 are aligned with four teeth 42 on the lamination stack 38. The two teeth on the lamination stack 36 located between permanent magnets 68 and 70 and between permanent magnets 66 and 72 are aligned with slots in the lamination stack 38. Permanent magnets are not placed in all of the notches so as to maintain sufficient air circulation for cooling the machine.

Figure 4:
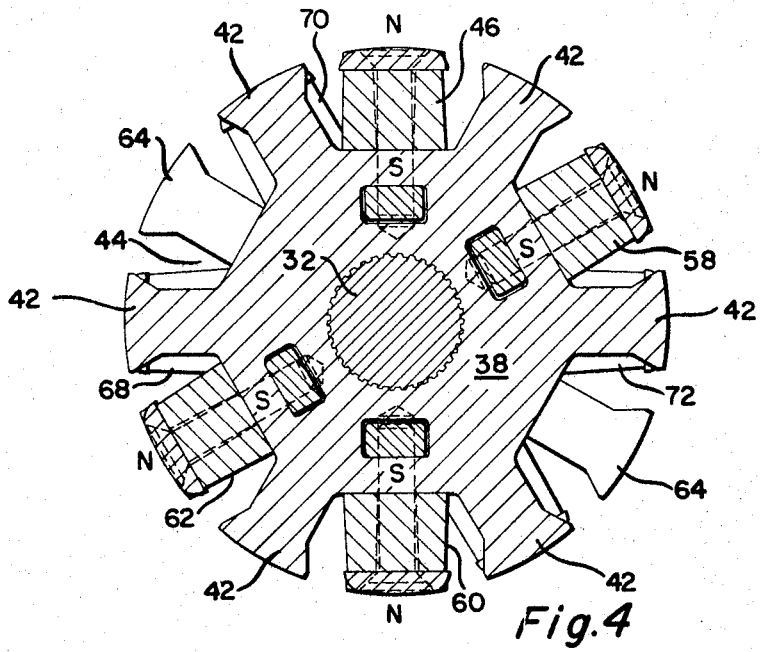
FIGURE 4 is a sectional view of the rotor of the generator of this invention taken along line 4—4 of FIGURE 1.
Figure 5:
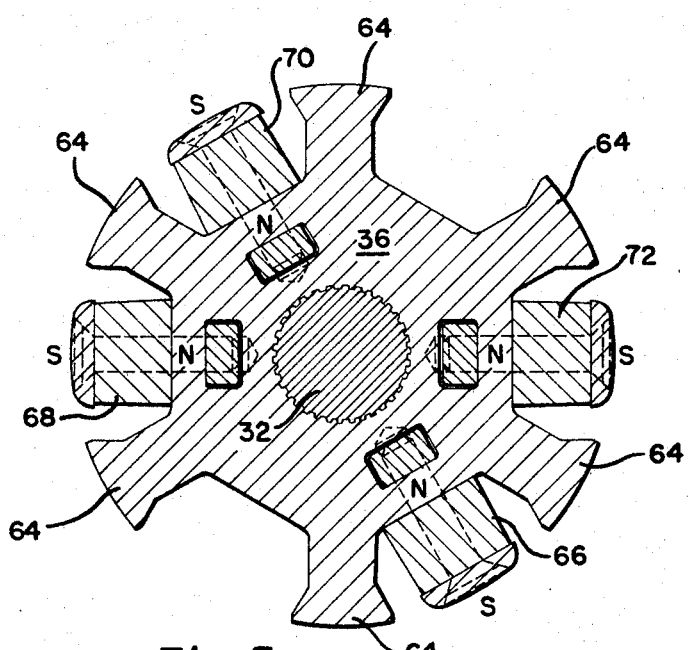
FIGURE 5 is a sectional view of a rotor for the generator of this invention taken along line 5—5 of FIGURE 1.

The permanent magnets of the two stacks of laminations have the polarities indicated on FIGURES 2, 4 and 5. It will be appreciated that the lamination stacks 36 and 38 and their permanent magnets are identical in construction but are displaced angularly as has been described. The polarity of the permanent magnets on each stack of laminations is reversed, however, as is apparent from an inspection of FIGURES 2, 4 and 5.

The operation of the generator illustrated in FIGURE 1 will now be described. Before describing the flux paths for the generator shown in FIGURE 1, it is pointed out that the flux generated by the permanent magnets on each stack of rotor laminations opposes the flux generated by the main field coil 28 in the frame 10 and in the core 40 of the rotor. Even though the flux which is generated by the permanent magnets and the flux which is generated by the main field coil 28 is in opposition in the frame 10 and in the core 40, this flux is additive in the air gap between the rotor and stator. This means the useful flux which links the conductors of the stator winding is an amount of flux that is proportional to the flux generated by the main field coil 28 and an additional flux provided by the permanent magnets in the rotor stacks 36 and 38.

To further explain the fact that the useful flux is made up of the flux generated by the permanent magnets and by the flux generated by the main field coil 28, it will be appreciated that when the shaft 32 is driven and when the field coil 28 is energized from a source of direct current of the proper polarity, magnetic flux will flow, for example, from the outer ends of permanent magnets 46, 58, 60 and 62 into the stator stack 18 and past one end of the stator winding 24. The flux generated by the permanent magnets will then flow through the frame 10 and then back through an opposite end of the stator stack 16. The magnetic flux generated by the permanent magnets will then flow from the stator stack 16 into the permanent magnets 66, 68, 70 and 72 and then returns to the opposite side of the permanent magnets carried by lamination stack 38 through the magnetic core 40.

The flux generated by the main field coil will oppose the flux generated by the permanent magnets in the frame 10 and in the core 40 but aids the flux generated by the permanent magnets insofar as useful flux for inducing voltages in stator winding 24 is concerned. There are various methods of explaining this, one of which is that since the flux of the main field coil 28 opposes the flux generated by the permanent magnets in the core 40 and in the frame 10, some of the flux generated by a permanent magnet, for example, permanent magnet 58 is deflected to adjacent pole teeth 42 on the same stack 38. Thus, the flux that is diverted to adjacent pole teeth 42 will be in the same direction as it enters the pole teeth 42 as the flux generated by the main field coil 28.

The magnetic circuit may be thought of as consisting of the main field coil 28 as one source of magnetic flux and the permanent magnets respectively form stacks 36 and 38 as two other sources of flux. From the preceding description of the polarities and positions of the permanent magnets, it is seen that the main field coil as one source of flux is connected in a series magnetic circuit with the other two sources of flux provided by the permanent magnets of the two stacks 36 and 38. The polarities of the sources of flux are such that in this series circuit, the magnetic flux of the two sources provided by the two sets of permanent magnets is additive but this flux opposes the flux generated by the field coil 28 in both the core 40 and the frame 10. On the other hand, the permanent magnets viewed as the two sources of magnetic flux cause flux to flow through the air gap of the machine which is in a direction that adds to the magnetic flux provided by the field coil 28. The flux generated by the main field coil 28 flows, for example, through frame 10, through stator stack 18, through pole teeth 42 on stack 38, through core 40, through the pole teeth 64 in rotor stack 36, through stator stack 16 and then back to the frame 10.

Another way of explaining the operation of the generator of this invention is that the rotor stacks 36 and 38 are magnetic elements which vary the reluctance of the magnetic circuit coupling the rotor and the stator. Thus, when a notch of either stack is aligned with one of the conductors of the stator winding, the reluctance of the particular magnetic path coupled to a conductor is increased as compared to the situation where a tooth of one of the rotor stacks, for example, tooth 42 is aligned with the same point on the stator. This means that the flux developed by the field coil 28 which links the stator conductors is a pulsating flux due to the variable reluctance magnetic circuit provided by the alternate notches and teeth of the rotor stacks. If the permanent magnets were not provided in the notches of the rotor stacks, the flux linking a given stator conductor would vary between maximum and minimum values depending upon the reluctance of the magnetic circuit which, of course, depends upon whether or not a tooth or a notch is positioned in any given position in regard to the stator. The minimum flux in the magnetic circuit is the flux developed by the field coil 28 as determined by a magnetic circuit having a reluctance including the air gap of the notch. The maximum magnetic flux is that determined by a magnetic circuit including a tooth which reduces the reluctance. By using permanent magnets in at least some of the notches, the minimum flux level is reduced as compared to the situation where minimum flux is provided due to the air gap of the notch, since the permanent magnets oppose the field provided by the field coil 28 and the result is that the difference between the maximum and minimum flux is increased to therefore increase the effective flux available to induce voltages in the stator.

The flux that traverses the air gap between the rotor and stator and the flux that links the opposite ends of the stator winding 24 reverses its direction. This means that alternating current will be induced in the stator winding 24 when the rotor 30 is rotating and when the main field coil 28 is energized with direct current.

As was pointed out hereinbefore, the flux of the reverse field coil 27 opposes the flux generated by the main field coil 28 and this flux will therefore be in the same direction as the flux generated by the permanent magnets in the frame 10 and core 40 but will oppose the flux of the permanent magnets in the air gap between the rotor and stator so that the net useful flux for generating alternating current is reduced when the field coil 27 is energized. It is possible to bring the output voltage to a zero value by energization of the field coil 27 when the next flux produced by the field coil 27 overcomes that produced by the permanent magnets.

The conductors of the stator winding 24 are wound in the slots of the stacks 16 and 18 in such a manner that the reversal of flux in the air gap between the rotor and stator and the flux that links the stator winding 24 causes an alternating current to be induced in the stator winding 24 as the rotor 30 rotates.

Figure 3:
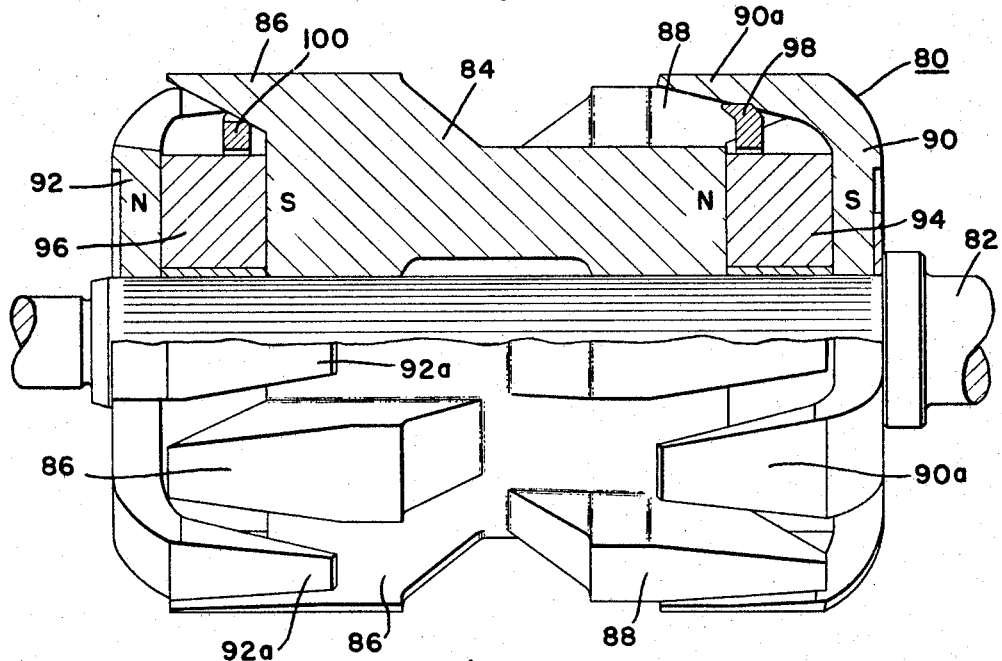
FIGURE 3 is a side view partly in section of a rotor which can be used in place of the rotor shown in FIGURES 1 and 2.

Referring now to FIGURE 3, a rotor is illustrated which can be subsituted for the rotor 30 illustrated in FIGURES 1 and 2. The rotor of FIGURE 3 is generally designated by reference numeral 80. This rotor includes a non-magnetic shaft 82 which supports a one-piece magnetic core 84. The core 84 has a plurality of integral teeth 86 and a plurality of integral teeth 88 face in opposite directions and the teeth 86 and 88 are circumferentially off-set from each other as is apparent from an inspection of FIGURE 3.

The shaft 82 carries magnetic pole members 90 and 92. The pole member 90 has circumferentially spaced teeth 90a which fit between the circumferentially spaced teeth 88 of magnetic core 84. In a similar fashion, the pole member 92 has teeth 92a circumferentially spaced which fit between the circumferentially spaced teeth 86 of core 84.

An annular permanent magnet 94 is located between the core 84 and the pole 90. Another annular permanent magnet 96 is located between the pole 92 and the core 84.

A pair of annular noise suppressor rings 98 and 100 which are formed of a nonmagnetic material such as aluminum engage the alternate teeth or fingers of the core and poles at opposite ends of the rotor.

The core 84 and the poles 90 and 92 are secured to the shaft 82 in such a manner that they rotate with and are driven by the shaft.

The rotor of FIGURE 3 can be used with the stator of FIGURE 1 and with such an arrangement, the flux generated by the two permanent magnets 94 and 96 which are polarized as shown in FIGURE 3 again opposes the flux generated by the main field coil in the frame 10 and in the core 84. If the machine has a reverse field coil, the flux generated by this coil opposes the flux generated by the main field coil and will flow in the same direction as the flux generated by the permanent magnets in the frame 10 and core 84.

While the embodiments of the present invention as herein disclosed, constitute a preferred form, it is to be understood that other forms might be adopted.

What is claimed is as follows:

1. An alternating current generator comprising, a metal frame, first and second axially spaced stacks of stator laminations carried by said frame, a field coil fixed with respect to said frame and located between said stacks of laminations, a coil winding located in the slots of said stator laminations and within said field coil, a rotor member rotatable with respect to said stacks of said stator laminations and including first and second axially spaced stacks of rotor laminations which are located adjacent said first and second stacks of stator laminations, said rotor laminations having alternate notches and teeth and having permanent magnets located in at least some of the notches.

2. An alternating current generator comprising, a frame formed of magnetic material, first and second axially spaced stator cores supported by said frame, a stator winding located in the slots of both of said cores, a field coil positioned between said cores, a rotor member rotatable within said cores, said rotor member having first and second axially spaced magnetic parts located in a magnetic circuit with said first and second stator cores, said magnetic parts having alternate notches and teeth, and permanent magnets located in at least some of the notches of said magnetic parts, said permanent magnets being arranged such that a permanent magnet on one of said magnetic parts is aligned with a tooth on the other magnetic part.

3. A rotor member for an alternating current generator comprising, a shaft, first and second axially spaced stacks of laminations carried by said shaft, a member formed of magnetic material positioned between said stacks of laminations for completing a magnetic circuit between said stacks of laminations, said stacks of laminations being formed to provide alternate teeth and notches, and a plurality of permanent magnets disposed respectively within certain of the notches of each stack of laminations, the permanent magnets on one of said stacks of laminations being poled in an opposite direction from the permanent magnets carried by the other stack of laminations.

4. An alternating current generator comprising, a stator including a coil winding, a fixed field coil, a rotor including a magnetic part having circumferentially spaced alternate notches and teeth connected in a magnetic circuit with said stator and with said field coil, said teeth and notches varying the reluctance of said magnetic circuit as said rotor rotates to provide maximum and minimum flux linking respective conductors of said stator during rotation of said rotor, and a plurality of permanent magnets located in at least some of the notches of said rotor and poled to oppose the unidirectional flux provided by said fixed field coil.

5. An alternating current generator comprising, first and second axially spaced stator cores, a stator winding disposed in slots of said stator cores, a field coil located in a magnetic circuit with said stator cores, a rotor member including axially spaced magnetic elements cooperating respectively with said stator cores, each of said magnetic elements having circumferentially spaced alternate notches and teeth for varying the reluctance of the magnetic circuit coupling said stator cores and said rotor, and a plurality of permanent magnets located at least in some of the notches of said magnetic elements, said permanent magnets being poled to oppose the flux developed by said field coil whereby the difference in the maximum and minimum flux developed in said machine by varying the reluctance of the magnetic circuit is increased by said permanent magnets.

6. An alternating current generator comprising, a frame, first and second axially spaced stator cores formed of magnetic material fixed to said frame having radially extending slots, an output winding for said generator positioned at least partially in said slots of said stator cores, a field coil located between said stator cores, and a rotor member supported by said frame rotatable within said stator cores, said rotor member having first and second axially spaced magnetic rotor parts aligned respectively with said first and second stator cores, each rotor part having alternate notches and teeth, and at least one permanent magnet positioned within a notch of each rotor part, said permanent magnets and field coil providing flux for said stator cores of said generator.

7. A rotor for an alternating current generator comprising, a shaft, a core member formed of magnetic material fixed to said shaft, said core member having integral teeth extending axially from each end of said core member, first and second pole members formed of magnetic material carried by said shaft and positioned adjacent the opposite ends of said core member, each of said pole members having axially extending teeth located between the teeth extending from the opposite ends of said core member, and an annular permanent magnet positioned between each end of said core member and a respective pole member, said permanent magnets rotatable with said shaft.

8. An alternating current generator comprising, a frame, first and second axially spaced stator cores carried by said frame each having slots, an output winding for said generator positioned at least partially in said slots of said stator cores, a field coil located between said stator cores, a rotor rotatably supported by said frame, said rotor including a shaft supporting a core member formed of magnetic material, first and second pole members formed of magnetic material supported by said shaft and rotatable therewith, said core member having teeth extending axially from each end of said core member, said pole members located adjacent the ends of said core member and each pole member having teeth located between the teeth of said core member, the outer periphery of the teeth of said core member and pole members aligned with the inner periphery of said stator cores, and an annular permanent magnet located respectively between each end of said core member and a pole member, said permanent magnets being rotatable with said shaft.

References Cited

UNITED STATES PATENTS

| | | | |
|---|---|---|---|
| 2,380,966 | 8/1945 | Iden | 310—168 |
| 2,651,733 | 9/1953 | Stark | 310—156 |
| 2,802,959 | 8/1957 | Powers | 310—263 |
| 2,931,929 | 4/1960 | Snowden et al. | 310—156 |
| 3,258,620 | 6/1966 | Imanuel | 310—168 |

MILTON O. HIRSHFIELD, *Primary Examiner.*

L. L. SMITH, *Assistant Examiner.*